(12) United States Patent
Chen et al.

(10) Patent No.: US 9,799,089 B1
(45) Date of Patent: Oct. 24, 2017

(54) PER-SHADER PREAMBLE FOR GRAPHICS PROCESSING

(71) Applicant: QUALCOMM Incorporated, San Diego, CA (US)

(72) Inventors: Lin Chen, San Diego, CA (US); Yun Du, San Diego, CA (US); Andrew Evan Gruber, Arlington, MA (US); Guofang Jiao, San Diego, CA (US); Chun Yu, San Diego, CA (US); David Rigel Garcia Garcia, North York, CA (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 15/162,272

(22) Filed: May 23, 2016

(51) Int. Cl.
| | | |
|---|---|---|
| *G06T 1/20* | (2006.01) | |
| *G06T 15/80* | (2011.01) | |
| *G06T 1/60* | (2006.01) | |

(52) U.S. Cl.
CPC .............. *G06T 1/20* (2013.01); *G06T 15/80* (2013.01); *G06T 1/60* (2013.01)

(58) Field of Classification Search
CPC .............. G06T 1/20; G06T 15/80; G06T 1/60
See application file for complete search history.

(56) References Cited

U.S. PATENT DOCUMENTS

| | | |
|---|---|---|
| 7,164,427 B2 | 1/2007 | Doyle et al. |
| 9,123,167 B2 | 9/2015 | Li et al. |
| 2006/0170680 A1 | 8/2006 | Peeper et al. |
| 2010/0164983 A1 | 7/2010 | Lawrence et al. |
| 2014/0022266 A1 | 1/2014 | Metz et al. |
| 2014/0354669 A1 | 12/2014 | Galazin et al. |
| 2014/0362102 A1 | 12/2014 | Cerny et al. |
| 2014/0372703 A1 | 12/2014 | Ricketts et al. |
| 2015/0348222 A1 | 12/2015 | Surti et al. |

OTHER PUBLICATIONS

U.S. Appl. No. 15/162,198, filed by Lin Chen on May 23, 2016.
International Search Report and Written Opinion—PCT/US2017/026835—dated Jul. 4, 2017 14 pages.
"Anonymous: "glDrawElementsInstanced", Jan. 1, 2014, XP055385146, Retrieved from the Internet: URL:https://www.khronos.org/registry/OpenGL-Refpages/gl4/html/glDrawElementsInstanced.xhtml [retrieved on Jun. 26, 2017], 2 pages."

(Continued)

*Primary Examiner* — Maurice L McDowell, Jr.
(74) *Attorney, Agent, or Firm* — Shumaker & Sieffert, P.A.

(57) ABSTRACT

A method for processing data in a graphics processing unit including receiving a code block of instructions common to a plurality of groups of threads of a shader, executing the code block of instructions common to the plurality of groups of threads of the shader creating a result by a first group of threads of the plurality of groups of threads, storing the result of the code block of instructions common to the plurality of groups of threads of the shader in on-chip random access memory (RAM), the on-chip RAM accessible by each of the plurality of groups of threads, and upon a determination that storing the result of the code block of instructions common to the plurality of groups of threads of the shader has completed, returning the result of the code block of instructions common to the plurality of groups of threads of the shader from on-chip RAM.

30 Claims, 7 Drawing Sheets

(56) References Cited

OTHER PUBLICATIONS

Anonymous: "Vertex Rendering—OpenGL Wiki", Jan. 24, 2016, XP055374109, Retrieved from the Internet: URL: https://www.khronos.org/opengl/wiki/Vertex Rendering [retrieved on May 18, 2017], 13 pages.

International Search Report and Written Opinion—PCT/US2017/026842 dated Jul. 12, 2017, 18 pages.

Ivson P., et al., "Instanced Rendering of Massive CAD Models Using Shape Matching", 27th SIBGRAPI Conference on Graphics, Patterns and Images, IEEE, Aug. 26, 2014, pp. 335-342, XP032653541, DOI: 10.1109/SIBGRAPI.2014.34.

```
┌─────────────────────────────────────────────────────────────────┐ ─ 37
│                                                                 │
│ SHPS Label_MAIN; // Shader Preamble Start                       │ ─ 39
│   //<<<preamble shader>>>                                       │
│   ...                                                           │
│   // Scalar instructions that save the results in uGPR          │
│   ADD z, y, x; // add x and y and store result in z             │
│   // Instructions that save data to constant RAM                │
│   STC c[5], z; // store z into constant RAM location 5          │
│   ...                                                           │
│   // load 4 constants from constant buffer 1 into constant RAM starting at location 10 │
│   LDC c[10], index, CB1, 4;                                     │
│   ...                                                           │
│                                                                 │
│   SHPE; // Shader Preamble End                                  │
├─────────────────────────────────────────────────────────────────┤
│ Label_MAIN:                                                     │ ─ 41
│   ...            // Main Shader                                 │
│                                                                 │
└─────────────────────────────────────────────────────────────────┘
```

FIG. 3

PER-SHADER PREAMBLE FOR GRAPHICS PROCESSING

TECHNICAL FIELD

The disclosure relates to data processing and, more particularly, to generation and execution of a shader preamble for graphics processing.

BACKGROUND

A single instruction, multiple data (SIMD) processing system is a class of parallel computing systems that includes multiple processing elements which execute the same instruction on multiple pieces of data. A SIMD system may be a standalone computer or a sub-system of a computing system. For example, one or more SIMD execution units may be used in a graphics processing unit (GPU) to implement a programmable shading unit that supports programmable shading. A SIMD processing system allows multiple threads of execution for a program to execute synchronously on the multiple processing elements in a parallel manner, thereby increasing the throughput for programs where the same set of operations needs to be performed on multiple pieces of data. A particular instruction executing on a particular SIMD processing element is referred to as a thread or a fiber. A group of threads may be referred to as a wave or warp.

Processing units, such as GPUs, include processing elements and a general purpose register (GPR) that stores data for the execution of an instruction. In some examples, a processing element executes instructions for processing one item of data, and respective processing elements store the data of the item or the resulting data of the item from the processing in the GPR. An item of data may be the base unit on which processing occurs. For instance, in graphics processing, a vertex of a primitive is one example of an item, and a pixel is another example of an item. There is graphics data associated with each vertex and pixel (e.g., coordinates, color values, etc.).

There may be multiple processing elements within a processor core of the processing element allowing for parallel execution of an instruction (e.g., multiple processing elements execute the same instruction at the same time). A shader is a computer program that can utilize a parallel processing environment (e.g., shader processors) and have been used to perform graphics rendering techniques on two and three-dimensional models at various stages of the graphics processing pipeline. Examples of shaders include pixel (or fragment) shaders, used to compute color and other attributes of a pixel (or fragment); vertex shaders, used to control position, movement, lighting, and color, or a vertex; geometry shaders, used to generate graphics primitives; tessellation-related shaders (e.g., hull shaders and/or domain shaders that are used when subdividing patches of vertex data into smaller primitives; and compute shaders are used for computing other information (e.g., non-graphics data).

SUMMARY

In general, the disclosure describes techniques for reducing redundant operations when executing a shader program on a shader processor of a GPU. In one example, this disclosure describes techniques whereby instructions that produce the same result among all parallel processing elements (e.g., threads) of a shader are identified and scheduled to execute once per shader and/or per command (e.g. a draw or dispatch command). A compiler may identify the redundant instructions and groups the redundant instructions into a code block called a per-shader preamble. The GPU system then executes the per-shader preamble once and saves the results of the redundant instructions of the per-shader preamble in on-chip memory. Each subsequent thread of the shader executing on the processing elements of the shader processor can then reuse the results without computing the same results again. Furthermore, data may be preloaded from system memory into on-chip random access memory (RAM) and/or on-chip state cache/buffer via the per-shader preamble.

In one example of this disclosure, a method of operating a graphic processing unit (GPU) comprising: receiving, by the GPU from a shader compiler, a shader program comprising a preamble code block and a main shader code block, the preamble code block being executable to produce one or more results, the one or more results being a same one or more results for each of a plurality of groups of threads executing the shader program, executing, by the GPU on a first group of threads of the plurality of groups of threads, the preamble code block to produce the one or more results, storing, by the GPU, the one or more results of the preamble code block, the one or more results of the preamble code block accessible by each of the plurality of groups of threads, and upon a determination that storing all of the one or more results of the preamble code block has completed, executing, by the GPU, the main shader code block for each thread of a group of threads of the plurality of groups of threads using the one or more results produced by executing the preamble code block.

In another example, an apparatus for processing data, the apparatus comprising: a graphics processing unit (GPU), the GPU comprising a constant memory and a shader core, the shader core comprising a control unit, a plurality of processing elements, and a constant memory, wherein the control unit is configured to: receive, from a shader compiler, a shader program comprising a preamble code block and a main shader code block, the preamble code block being executable to produce one or more results, the one or more results being a same one or more results for each of a plurality of groups of threads executing the shader program, direct at least one of the plurality of processing elements to execute, on a first group of threads of the plurality of groups of threads, the preamble code block to produce the one or more results, store the one or more results of the preamble code block in the constant memory, the one or more results of the preamble code block accessible by each of the plurality of groups of threads, and upon a determination that storing all of the one or more results of the preamble code block has completed, direct at least one of the plurality of processing elements to execute the main shader code block for each thread of a group of threads of the plurality of groups of threads using the one or more results produced by executing the preamble code block.

In another example, an apparatus configured to operate a graphic processing unit (GPU), the apparatus comprising: means for receiving, from a shader compiler, a shader program comprising a preamble code block and a main shader code block, the preamble code block being executable to produce one or more results, the one or more results being a same one or more results for each of a plurality of groups of threads executing the shader program, means for executing, on a first group of threads of the plurality of groups of threads, the preamble code block to produce the one or more results, means for storing the one or more results of the preamble code block, the one or more results of the preamble code block accessible by each of the plurality of groups of threads, and means for executing upon a determination that storing all of the one or more results of the preamble code block has completed, the main shader code block for each thread of a group of threads of the plurality of groups of threads using the one or more results produced by executing the preamble code block.

In another example, a non-transitory computer-readable storage medium including instructions stored thereon that, when executed, cause at least one processor of to: receive, from a shader compiler, a shader program comprising a preamble code block and a main shader code block, the preamble code block being executable to produce one or more results, the one or more results being a same one or more results for each of a plurality of groups of threads executing the shader program, execute, on a first group of threads of the plurality of groups of threads, the preamble code block to produce the one or more results, store the one or more results of the preamble code block in the constant memory, the one or more results of the preamble code block accessible by each of the plurality of groups of threads, and upon a determination that storing all of the one or more results of the preamble code block has completed, execute the main shader code block for each thread of a group of threads of the plurality of groups of threads using the one or more results produced by executing the preamble code block.

The details of one or more examples are set forth in the accompanying drawings and the description below. Other features, objects, and advantages will be apparent from the description, drawings, and claims.

BRIEF DESCRIPTION OF DRAWINGS

FIG. 3 is a conceptual diagram illustrating an example a set of instructions.

DETAILED DESCRIPTION

Figure 1:
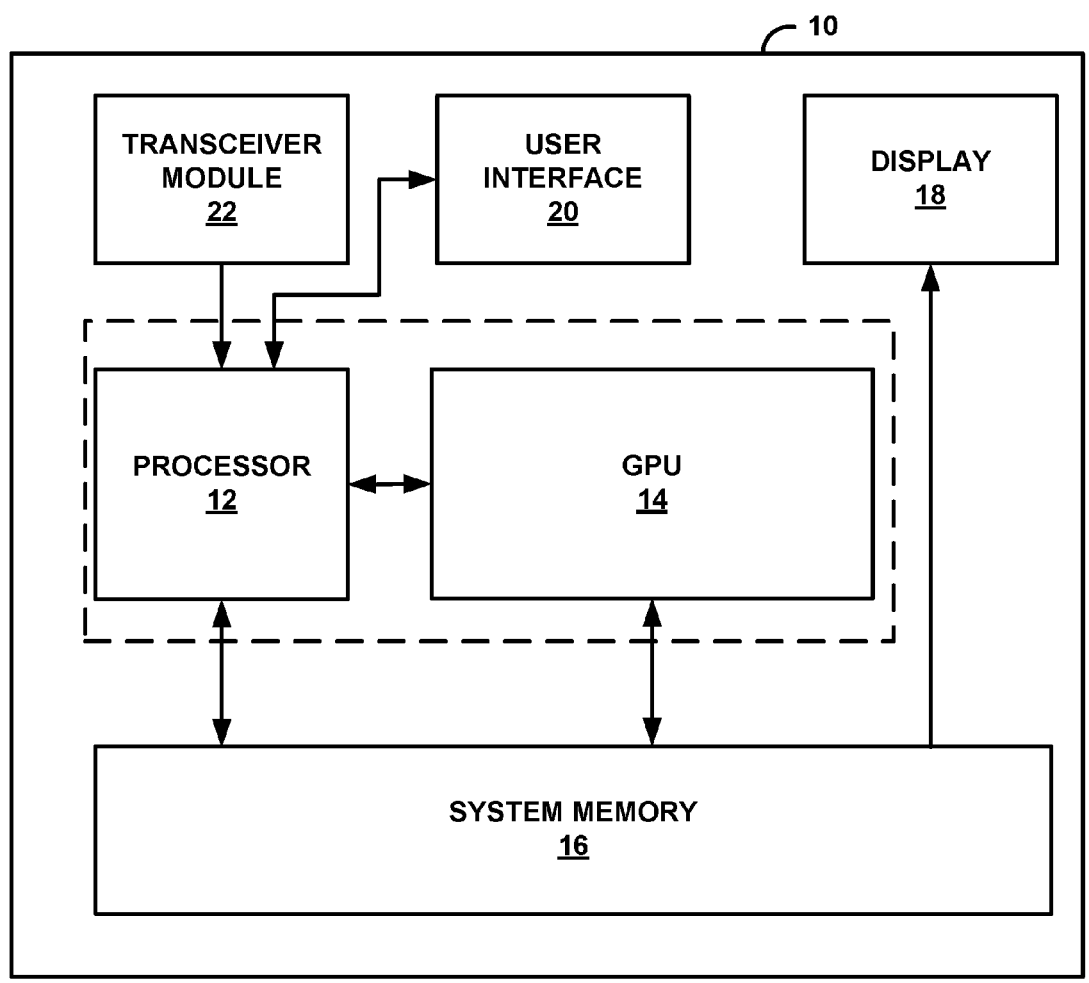
FIG. 1 is a block diagram illustrating an example device for processing data in accordance with one or more example techniques described in this disclosure.

Parallel processing units, such as graphics processing unit (GPUs) that are configured to perform many operations in parallel (e.g., at the same time or substantially the same time), include one or more processor cores (e.g., shader cores for a GPU) that execute instructions of one or more programs. For ease of description, the techniques described in the disclosure are described with respect to a GPU configured to perform graphics processing applications and/or general purpose GPU (GPGPU) applications. However, the techniques described in this disclosure may be extended to parallel processing units that are not necessarily GPUs or GPGPUs, as well as non-parallel processing units (e.g., ones not specifically configured for parallel processing).

The GPU may be designed with a single instruction, multiple data (SIMD) structure. In the SIMD structure, a shader core (or more generally a SIMD processing core) includes a plurality of SIMD processing elements, where each SIMD processing element executes instructions of the same program, but on different data. A particular instruction executing on a particular SIMD processing element is referred to as a thread or a fiber. A group of threads may be referred to as a wave or warp. All of the processing elements together that execute a warp may be referred to as a vector processing unit, where each lane (e.g., processing element) of the vector executes one thread. Each SIMD processing element may be considered as executing a different thread because the data for a given thread may be different; however, the thread executing on a processing element is the same instruction, of the same program, as the instruction executing on the other processing elements. In this way, the SIMD structure allows the GPU to perform many tasks in parallel (e.g., at the same time).

A shader (or shader program) is a computer program that can utilize a parallel processing environment (e.g., shader processors). A draw command refers to one or more of a family of commands executed by a processing unit (e.g. a CPU) to a graphics application program interface (API) which interacts with a graphical processing unit (e.g. GPU) to draw (e.g. render) an object for display on a display device. A dispatch command refers to a one or more of a family of commands executed by a processing unit (e.g. a CPU) to a graphics API which interacts with a graphics processing unit (GPU) to execute non-display operations. Elements of a draw or dispatch command may execute redundant operations in an associated shader. In particular, a GPU may perform batch processing commands such as draw calls and dispatches. A command may instruct the GPU to use one or more shaders to process elements such as work items, pixels, and vertices. A shader may then be invoked for the element. The same shader may be invoked for the command's elements of the same type. An operation of the shader may produce the same result for all elements of the same type. Such operations may be identified and executed a single time without the need to redundantly execute the same code segment for each element.

This disclosure describes methods, techniques, and devices whereby operations of a shader that produce the same result for all elements of the same type are identified and scheduled to execute once per shader type and/or per command (e.g. a draw or dispatch command). A compiler may identify the redundant instructions and groups the redundant instructions into a code block called a per-shader preamble. The GPU may execute the per-shader preamble once and saves the results of the redundant instructions of the per-shader preamble in on-chip memory (e.g., random access memory (RAM)). The redundant instructions may allow for the use of a read/write constant RAM and the constants used in the calculations of the redundant instructions may be loaded into this read/write constant RAM prior to the execution of the redundant instructions (i.e., the per-shader preamble). The elements of the shader can reuse the results without computing the same results again. This may significantly improve performance and reduce power consumption.

FIG. 1 is a block diagram illustrating an example device for processing data in accordance with one or more example techniques described in this disclosure for the generation and execution of per-shader preambles. FIG. 1 illustrates device 10, examples of which include, but are not limited to, video devices such as media players, set-top boxes, wireless communication devices, such as mobile telephones, personal digital assistants (PDAs), desktop computers, laptop computers, gaming consoles, video conferencing units, tablet computing devices, and the like.

In the example of FIG. 1, device 10 includes processor 12, graphics processing unit (GPU) 14, and system memory 16. In some examples, such as examples where device 10 is a mobile device, processor 12 and GPU 14 may be formed as an integrated circuit (IC). For example, the IC may be considered as a processing chip within a chip package, such as a system on chip (SoC). In some examples, processor 12 and GPU 14 may be housed in different integrated circuits (e.g., different chip packages) such as examples where device 10 is a desktop or laptop computer. However, it may be possible that processor 12 and GPU 14 are housed in different integrated circuits in examples where device 10 is a mobile device.

Examples of processor 12 and GPU 14 include, but are not limited to, one or more digital signal processors (DSPs), general purpose microprocessors, application specific integrated circuits (ASICs), field programmable logic arrays (FPGAs), or other equivalent integrated or discrete logic circuitry. Processor 12 may be the central processing unit (CPU) of device 10. In some examples, GPU 14 may be specialized hardware that includes integrated and/or discrete logic circuitry that provides GPU 14 with massive parallel processing capabilities suitable for graphics processing (e.g., a SIMD processor). In some instances, GPU 14 may also include general purpose processing capabilities, and may be referred to as a general purpose GPU (GPGPU) when implementing general purpose processing tasks (i.e., non-graphics related tasks).

For purposes of illustration, the techniques described in this disclosure are described with GPU 14. However, the techniques described in this disclosure are not so limited. The techniques described in this disclosure may be extended to other types of parallel processing units (e.g., processing units that provide massive parallel processing capabilities, even if not for graphics processing). Also, the techniques described in this disclosure may be extended to processing units not specifically configured for parallel processing.

Processor 12 may execute various types of applications. Examples of the applications include operating systems, web browsers, e-mail applications, spreadsheets, video games, or other applications that generate viewable objects for display. System memory 16 may store instructions for execution of the one or more applications. The execution of an application on processor 12 causes processor 12 to produce graphics data for image content that is to be displayed. Processor 12 may transmit graphics data of the image content to GPU 14 for further processing.

As an example, the execution of an application on processor 12 causes processor 12 to produce vertices of primitives, where the interconnection of primitives at respective vertices forms a graphical object. In this example, the graphics data that processor 12 produces are the attribute data for the attributes of the vertices. For example, the application executing on processor 12 may generate color values, opacity values, coordinates, etc. for the vertices, which are all examples of attributes of the vertices. Some of the attributes of the vertices may be generated using, in part, code that would be replicated for each vertex, particularly where such code, once executed, evaluates to a constant. Processor 12 may then execute the identified redundant code a single time (e.g., during the execution for the first vertex) and reuse that result for the rest of the vertices that utilize such redundant code. In general, the techniques are extendable to data types (e.g., counters) other than attribute data, and the techniques should not be considered limited to attribute data or limited to examples of attribute data such as color values, opacity values, coordinates, etc.

In some non-graphics related examples, processor 12 may generate data that is better suited to be processed by GPU 14. Such data need not be for graphics or display purposes. For instance, processor 12 may output data on which matrix operations need to be performed by GPU 14, and GPU 14 may in turn perform the matrix operations.

In general, processor 12 may offload processing tasks to GPU 14, such as tasks that require massive parallel operations. As one example, graphics processing requires massive parallel operations, and processor 12 may offload such graphics processing tasks to GPU 14. However, other operations such as matrix operations may also benefit from the parallel processing capabilities of GPU 14. In these examples, processor 12 may leverage the parallel processing capabilities of GPU 14 to cause GPU 14 to perform non-graphics related operations.

Processor 12 may communicate with GPU 14 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API and processor 12 and GPU 14 may utilize any technique for communication.

Device 10 may also include display 18, user interface 20, and transceiver module 22. Device 10 may include additional modules or units not shown in FIG. 1 for purposes of clarity. For example, device 10 may include a speaker and a microphone, neither of which are shown in FIG. 1, to effectuate telephonic communications in examples where device 10 is a mobile wireless telephone. Furthermore, the various modules and units shown in device 10 may not be necessary in every example of device 10. For example, user interface 20 and display 18 may be external to device 10 in examples where device 10 is a desktop computer. As another example, user interface 20 may be part of display 18 in examples where display 18 is a touch-sensitive or presence-sensitive display of a mobile device.

Display 18 may comprise a liquid crystal display (LCD), a cathode ray tube (CRT) display, a plasma display, a touch-sensitive display, a presence-sensitive display, or another type of display device. Examples of user interface 20 include, but are not limited to, a trackball, a mouse, a keyboard, and other types of input devices. User interface 20 may also be a touch screen and may be incorporated as a part of display 18. Transceiver module 22 may include circuitry to allow wireless or wired communication between device 10 and another device or a network. Transceiver module 22 may include modulators, demodulators, amplifiers and other such circuitry for wired or wireless communication.

System memory 16 may be the memory for device 10. System memory 16 may comprise one or more computer-readable storage media. Examples of system memory 16 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

In some aspects, system memory 16 may include instructions that cause processor 12 and/or GPU 14 to perform the functions ascribed in this disclosure to processor 12 and GPU 14. Accordingly, system memory 16 may be a computer-readable storage medium having instructions stored thereon that, when executed, cause one or more processors (e.g., processor 12 and GPU 14) to perform various functions.

In some examples, system memory 16 may be a non-transitory storage medium. The term "non-transitory" may indicate that the storage medium is not embodied in a carrier wave or a propagated signal. However, the term "non-transitory" should not be interpreted to mean that system memory 16 is non-movable or that its contents are static. As one example, system memory 16 may be removed from device 10, and moved to another device. As another example, memory, substantially similar to system memory 16, may be inserted into device 10. In certain examples, a non-transitory storage medium may store data that can, over time, change (e.g., in RAM).

For example, as described in more detail elsewhere in this disclosure, system memory 16 may store the code for a compiler that executes on processor 12 that performs techniques of one or more examples described in this disclosure. System memory 16 may also store code for shader programs (e.g., a vertex shader, a pixel or fragment shader, tessellation-related shaders, a compute shader, etc.) that execute on a shader core (also referred to as a shader processor or kernel) of GPU 14. Furthermore, system memory 16 may store one or more constant buffers. Constant load instructions may allow compiler 38 to load constants from system memory into a constant memory 44 of GPU 14. Constants may be loaded into GPRs 26 (or uGPRs 27) if constant memory 44 is full.

The term graphics item is used in this disclosure to refer to a base unit on which GPU 14 performs parallel processing. GPU 14 may process a plurality of graphics items in parallel (e.g., at the same time). For example, a vertex shader may process a vertex, and GPU 14 may execute a plurality of instances of the vertex shader in parallel to process a plurality of vertices at the same time. Similarly, a pixel or fragment shader may process a pixel of a display, and GPU 14 may execute a plurality of instances of the pixel shader in parallel to process a plurality of pixels of the display at the same time. A vertex and a pixel are examples of a graphics item. For non-graphics related applications, the term "work item" may refer to smallest unit on which GPU 14 performs processing.

As will be explained in more detail below, according to various examples of the disclosure, GPU 14 may be configured to receive an indication (e.g., in a per-shader preamble) that all threads of a warp (or over multiple warps) in the GPU 14 are to execute a first set of instructions that are common between each thread (over a single or multiple warps) during the execution of the first thread/warp that were identified by a compiler executed by processor 12. The instructions in the per-shader preamble may have been identified for inclusion in the per-shader preamble because the instructions use non-divergent inputs (e.g., they are scalar and/or uniform across all fibers/threads) that may be constant and/or variable/dynamic. GPU 14 may then access those constants from system memory 16 and store them in constants RAM on GPU 14. When executing the common instructions of the per-shader preamble, GPU 14 may access the constants in the constant RAM. GPU 14 may perform the common instructions. After performing the common instructions of the per-shader preamble, GPU 14 may store the results in a read/write constant RAM. In another example, the results (e.g. constant values) of the per-shader preamble may be stored in one or more general purpose registers (GPR), uniform GPRs (uGPRs), or shared GPRs (sGPRs), in other on-chip RAM on GPU 14 or on system memory 16. However, GPRs, uGPRs, and sGPRs may be cleared between each warp (i.e., data cannot be shared in GPRs between warps) and such data must be rewritten into such GPRs per warp. GPRs may also store data for (and be accessible by) a specific thread/fiber whereas uGPRs may store data for (and be accessible by) all threads/fibers in a wave/warp. Data may also be stored in system memory 16 or on-chip (e.g., on GPU 14) memory that permits inter-warp data sharing. The results of the execution of the per-shader preamble may be reused for each element (e.g., thread) of the shader without reproducing the same results a second (or greater) time. The results of the execution of the per-shader preamble may also be reused for multiple warps of the shader without reproducing the same results a second (or greater) time.

Figure 2:
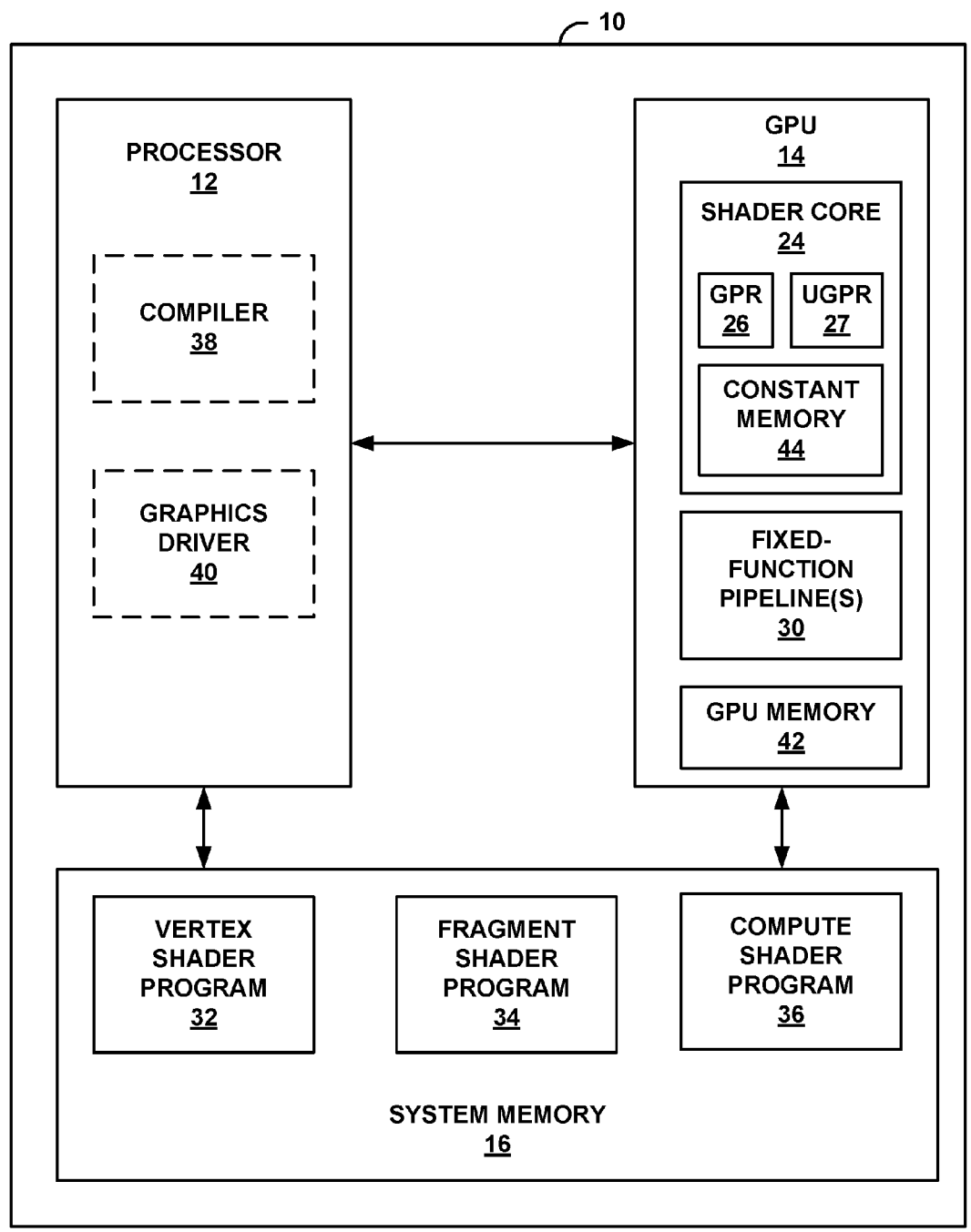
FIG. 2 is a block diagram illustrating components of the device illustrated in FIG. 1 in greater detail.

FIG. 2 is a block diagram illustrating components of the device illustrated in FIG. 1 in greater detail. As illustrated in FIG. 2, GPU 14 includes shader core 24, which includes a general purpose register (GPR) 26, uniform GPR 27, and constant memory 44, fixed-function pipeline(s) 30, and GPU Memory 42. GPR 26 may include a single GPR, a GPR file, and/or a GPR bank. uGPR 27 may include a single uGPR, a uGPR file, and/or a uGPR bank. GPR 26 may store data accessible to a single thread/fiber. uGPR 27 may store data accessible by all threads/fibers in a single wave/warp. Shader core 24 and fixed-function pipeline(s) 30 may together form a processing pipeline used to perform graphics or non-graphics related functions. The processing pipeline performs functions as defined by software or firmware executing on GPU 14 and performs functions by fixed-function units that are hardwired to perform specific functions. Such fixed-function pipelines 30 of GPU 14 may include a texture pipeline, a tessellation stage, clipping that fall outside the viewing frustum, and lighting.

The software and/or firmware executing on GPU 14 may be referred to as shader programs (or simply shaders), and the shader programs may execute on shader core 24 of GPU 14. Although only one shader core 24 is illustrated, in some examples, GPU 14 may include two or more shader cores similar to shader core 24. Fixed-function pipeline(s) 30 includes the fixed-function units. Shader core 24 and fixed-function pipeline(s) 30 may transmit and receive data from one another. For instance, the processing pipeline may include shader programs executing on shader core 24 that receive data from a fixed-function unit of fixed-function pipeline 30 and output processed data to another fixed-function unit of fixed-function pipeline 30.

Shader programs provide users and/or developers with functional flexibility because a user can design the shader program to perform desired tasks in any conceivable manner. The fixed-function units, however, are hardwired for the manner in which the fixed-function units perform tasks. Accordingly, the fixed-function units may not provide much functional flexibility.

Examples of the shader programs include vertex shader program 32, fragment shader program 34, and compute shader program 36. Vertex shader program 32 and fragment shader program 34 may be shader programs for graphics related tasks, and compute shader program 36 may be a shader program for a non-graphics related task. There are additional examples of shader programs such as geometry shaders and tessellation-related shaders, which are not described for purposes of brevity.

Graphics driver 40 executing on processor 12 may be configured to implement an application programming interface (API); although graphics driver 40 does not need to be limited to being configured in accordance with a particular API. In such examples, the shader programs (e.g., vertex shader program 32, fragment shader program 34, and compute shader program 36) may be configured in accordance with an API supported by graphics driver 40. In an example where device 10 is a mobile device, graphics driver 40 may be configured in accordance with the OpenGL ES API. The OpenGL ES API is specifically designed for mobile devices. In an example where device 10 is a non-mobile device, graphics driver 40 may be configured in accordance with the OpenGL API. Other API examples include the DirectX family of APIs by the Microsoft Corporation. Although not illustrated, system memory 16 may store the code for graphics driver 40 that processor 12 retrieves from system memory 16 for execution. Graphics driver 40 is illustrated in a dashed box to indicate that graphics driver 40 is software, executing on hardware (e.g., processor 12), in this example.

Graphics driver 40 may be configured to allow processor 12 and GPU 14 to communicate with one another. For instance, when processor 12 offloads graphics or non-graphics processing tasks to GPU 14, processor 12 offloads such processing tasks to GPU 14 via graphics driver 40.

As an example, processor 12 may execute a gaming application that produces graphics data, and processor 12 may offload the processing of this graphics data to GPU 14. In this example, processor 12 may store the graphics data in system memory 16, and graphics driver 40 may instruct GPU 14 with when to retrieve the graphics data, from where to retrieve the graphics data in system memory 16, and when to process the graphics data. Also, the gaming application may require GPU 14 to execute one or more shader programs. For instance, the gaming application may require shader core 24 to execute vertex shader program 32 and fragment shader program 34 to generate images that are to be displayed (e.g., on display 18 of FIG. 1). Graphics driver 40 may instruct GPU 14 when to execute the shader programs and instruct GPU 14 with where to retrieve the graphics data needed for the shader programs. In this way, graphics driver 40 may form the link between processor 12 and GPU 14.

In some examples, system memory 16 may store the source code for one or more of vertex shader program 32, fragment shader program 34, and compute shader program 36. In these examples, compiler 38 executing on processor 12 may compile the source code of these shader programs to create object or intermediate code executable by shader core 24 of GPU 14 during runtime (e.g., at the time when these shader programs are to be executed on shader core 24). In some examples, compiler 38 may pre-compile the shader programs and store the object or intermediate code of the shader programs in system memory 16.

In accordance with the techniques of this disclosure, compiler 38 (or in another example graphics driver 40) running on processor 12 may build a shader into multiple components including a "main" shader component and a "preamble" shader component. The main shader component may refer to a portion or the entirety of the shader program that does not include the preamble shader component. Compiler 38 may receive code to compile from a program executing on processor 12. Compiler 38 may also identify constant load instructions and common operations in the shader and position the common operations within the preamble shader component (rather than the main shader component). Compiler 38 may identify these common instructions, for example, by an exclusive use of constants (i.e., constant values) in the common instructions. Compiler 38 may utilize instructions such as a shader preamble start to mark the beginning of the shader preamble and shader preamble end to mark the end of the shader preamble. Compiler 38 may utilize a SHPS (shader preamble start) instruction to mark the beginning of the per-shader preamble. MAIN is an exemplary label that the SHPS instruction may branch to if the current wave is not the first wave (e.g., to a main shader block of code). Compiler 38 may utilize a SHPE (shader preamble end) instruction to mark the end of the per-shader preamble.

Shader core 24 may be configured to execute many instances of the same instructions of the same shader program in parallel. For example, graphics driver 40 may instruct GPU 14 to retrieve vertex values for a plurality of vertices, and instruct GPU 14 to execute vertex shader program 32 to process the vertex values of the vertices. In this example, shader core 24 may execute multiple instances of vertex shader program 32, and do so by executing one instance of vertex shader program 32 on one processing element of shader core 24 for each of the vertices.

During the processing of a first wave of the execution of a shader program 32, 34, or 36 on shader core 24, shader core 24 may execute the shader preamble. Constant inputs used in the execution of the shader preamble may be stored in a read/write constant memory 44 (e.g., constant RAM), GPRs (e.g., GPR 26), or uGPRs (e.g. uGPR 27). A load unit of shader core 24 may load the constants into constant memory 44. Instructions to the load unit of shader core 24 may be found within the per-shader preamble code block and may allow constants to be loaded from system memory 16 to on-chip constant memory on GPU 14.

In some examples, the shader preamble may be executed by a scalar processor (e.g., a single arithmetic logic unit (ALU)) on shader core 24. In other examples, the shader preamble may be executed by the parallel processing elements of shader core 24 (sometimes called a vector processor). Execution of the shader preamble may result in a constant value or set of values. The constant value preamble result may be stored in on-chip memory such as in uGPR 27, constant memory 44 (e.g., constant RAM), GPU memory 42, or system memory 16. Constant memory 44 may include memory accessible by all elements of the shader core 24 rather than just a particular portion reserved for a particular warp or thread such as values held in uGPR 27 or GPR 26. Constant memory 44 may also store data persistently between warps rather than needing to be reloaded with data prior to each warp. During execution of a subsequent warp of the execution of the shader the constant values (i.e. preamble results) calculated during the first warp of the execution of shader program 32, 34, or 36 may be retrieved from constant memory 44 rather than executing the redundant code. GPU 14 may ensure that only the first warp of the shader executes the shader preamble. GPU 14 may ensure that only the first warp of the shader executes the shader preamble via a flag in an on-chip internal state register, constant memory 44, or GPU memory 42. GPU 14 may also track that a warp that started execution of the shader preamble as the first warp. The flag denoting that a current warp is the first warp (or, in another example, that it is not the first warp) may be stored, by GPU 14, as a value in an on-chip internal state register, constant memory 44, or GPU memory 42. GPU 14 may also track whether the first warp has completed execution of the shader preamble instructions. The flag denoting the first warp has (or, in another example, has not) completed execution of the shader preamble instructions may be stored, by GPU 14, in an on-chip internal state register, constant memory 44 or GPU memory 42. Shader core 24 can utilize these flags to determine whether to execute the shader preamble (e.g., if this is the first warp and/or the preamble has not been executed previously) or not (e.g., if this is not the first warp and/or the preamble has been executed previously). Shader core 24 may also delay execution of a second warp of threads of shader program 32, 34, or 36 until completion of the execution of the shader preamble and loading of the constant results of the preamble in constant memory 44, GPU memory 42, or uGPR 27 by the GPU 14.

In an example, each type of shader core 24 can access context (e.g., flag) bits stored in an on-chip internal state register. Shader core 24 may have a 1-bit preamble_token_taken context bit that may indicate that the present warp is/is not the first warp and/or a warp (or no warp) on shader core 24 has started to execute the preamble. Both of these bits may be initialized to false when a particular type of shader (e.g. shader core 24) is loaded. For example, a first warp to execute a SHPS (e.g. a shader preamble start) instruction in a given shader core 24 or shader type finds the preamble_token_taken flag as false. Shader core 24 will set the preamble_token_taken flag to true. When the first warp executes a SHPE (e.g. shader preamble end) instruction, shader core 24 sets the preamble_completed flag to true. Shader core 24 will then continue executing code from the main shader instruction label. In a non-first warp, the preamble_token_taken flag may be set to true. All subsequent warps branch to the main code section (e.g., a MAIN label) and wait there until preamble_completed flag changes from false to true. When the change of the preamble_completed flag changes from false to true, shader core 24 executes subsequent waves.

FIG. 3 is a conceptual diagram showing a set of instructions 37 that include a shader preamble 39. In this example, shader preamble 39 comprises a shader preamble start instruction (SHPS) instruction. The shader preamble start instruction will branch to the "Label_MAIN" label (e.g., in the main shader instructions 41) if the preamble_token_taken flag is set to true only allow the shader preamble to be executed a single time. The instruction may also instruct the shader core 24 to set the preamble_token_taken flag to true when the preamble_token_taken flag is set to false.

The instruction (e.g., the ADD z, y, x instruction) illustrates a redundant instruction in the shader code. The instruction may be executed (e.g., "ADD z, y, x;" will add the values in "x" and "y" together and store the resulting value in "z"). Each of the redundant instructions is likewise executed. The redundant values may be saved to constant memory 44 via e.g., a store data into constant memory instruction (e.g., "STC c[5], z;" stores the value in "z" into constant RAM location 5). The redundant values may also be moved to uGPR 27 or GPR 26.

The next exemplary instruction may load a number of constants from a constant buffer into constant memory 44 via, e.g., a load constant instruction (e.g. "LDC c[10], index, CB1, 4;" will load 4 constants from constant buffer (CB) 1 into constant RAM starting at location 10.) Shader preamble 39 closes with a shader preamble end instruction (SHPE). In certain implementations, there may only be a single shader preamble start and shader preamble end instruction in a shader program 32, 34, or 36. Following shader preamble 39 is main shader instructions 41.

The instructions in the shader preamble 39 may include instructions that produce the same results for all threads of the shader (e.g., because such instructions only operate on constant values) and do not change between warps of shader execution. These instructions may be identified by the compiler 38.

Shader preamble 39 is then only executed a single time regardless of the number of warps of execution of the shader program 32, 34, or 36. Main shader instructions 41 are executed separately for each warp. Results generated in the execution of shader preamble 39 may be utilized in the execution of main shader instructions 41 and stored in constant memory 44. At execution, shader core 24 may utilize a variety of flags to determine whether shader preamble 39 has executed and thus does not need to execute the preamble code of shader preamble 39 a second time as well as determining where the result(s) of the execution of the shader preamble 39 that are stored within constant memory 44. The variety of flags may include a flag denoting that a current warp is the first warp (or, in another example, that it is not the first warp) and a flag denoting the first warp has (or, in another example, has not) completed execution of the shader preamble instructions. These flags may be stored, by GPU 14, in in an on-chip internal state register, constant memory 44 or GPU memory 42.

While the shader preamble 39 is illustrated as being in the beginning of shader code 37 prior to main shader instructions 41, shader preamble 39 may be interspersed inside shader code 37 only being delimitated by the shader preamble start instruction (e.g. SHPS) and shader preamble end instruction (SHPE). Furthermore, a shader preamble may be inside a control flow. If a shader preamble is inside a control flow, the wave to execute the preamble may not be the first wave of the shader.

Figure 4:
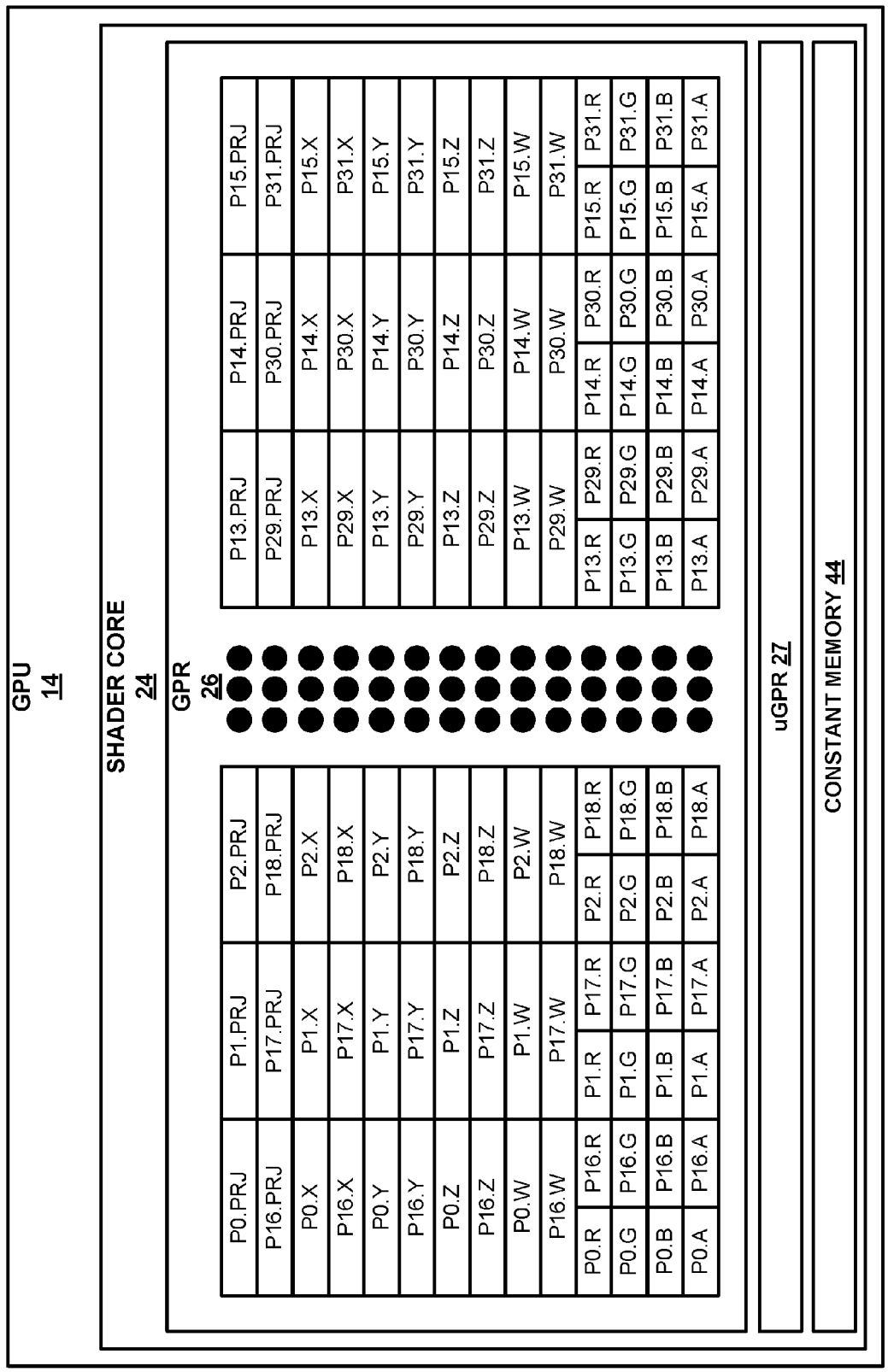
FIG. 4 is a conceptual diagram illustrating an example of data storage in a general purpose register (GPR) of a shader core of a GPU.

FIG. 4 is a conceptual diagram illustrating an example of data storage in a GPR of a shader core of a GPU. As illustrated, GPU 14 includes shader core 24, and shader core 24 includes GPR 26. As an example, shader core 24 may include thirty-two processing elements and each may execute one instance of a shader program to process one graphics item. GPR 26 may store data for the graphics items. For instance, GPR 26 may store attribute data for nine attributes for thirty-two graphics items. However, GPR 26 may store data for more or less than nine attributes for the thirty-two graphics items. Also, GPR 26 may store data that is not associated with an attribute of the graphics items, but is the data for a variable needed for processing the graphics items.

In the example illustrated in FIG. 4, the graphics items are identified as P0-P31, which may be vertices. The attribute is identified by the variable following the graphics item identifier. For example, P0.X refers to the x-coordinate for the P0 graphics item, P0.Y refers to the y-coordinate for the P0 graphics item, and so forth. P0.R, P0.G, P0.B, and P0.A refer to the red component, green component, blue component, and opacity of the P0 graphics item, respectively. The other graphics items (e.g., P1-P31) are similarly identified.

In other words, in FIG. 4, vertices P0-P31 are each associated with a plurality of variables. As one example, each of vertices P0-P31 is associated with a variable that identifies the x-coordinate (P0.X to P31.X). Each of vertices P0-P31 is associated with a variable that identifies the y-coordinate (P0.Y to P31Y), and so forth. Each one of these variables is needed for processing each of the plurality of graphics items. For instance, the variable that identifies the x-coordinate is needed for processing each of vertices P0-P31.

As also illustrated in FIG. 4, each of the graphics items also includes a PRJ attribute. The PRJ attribute is a projection matrix that a vertex shader executing on processing elements of shader core 24 may utilize. In this example, the PRJ attribute is another variable that is needed for processing each of vertices P0-P31. For example, the vertex shader may multiply the projection matrix with the respective coordinates (e.g., multiply P0.PRJ with P0.X, P0.Y, P0.Z, and P0.W).

It should be understood that there may be various units in which GPU 14 may store data (e.g., values). GPU 14 may store data in system memory 16 or may store data in local memory (e.g., cache). GPR 26 of shader core 24 is distinct from both system memory 16 and the local memory of GPU 14. For example, system memory 16 is accessible by various components of device 10, and these components use system memory 16 to store data. The local memory of GPU 14 is accessible by various components of GPU 14, and these components use the local memory of GPU 14 to store data. GPR 26, however, may only be accessible by components of shader core 24, and may only store data for the processing elements of shader core 24.

In some examples, one or more variables of graphics items in a graphic warp are uniform across the graphic warp. In such examples, rather than storing the uniform data for the one or more variables in separate entries for each thread/fiber in GPR 26, GPU 14 may store the uniform data a single time in uGPR 27 accessible by all threads/fibers in a warp/wave or in constant memory 44.

In one example, uGPR 27 may include a plurality of storage locations, where each storage location is associated with one attribute of the plurality of attributes of the graphics items. For instance, as illustrated in FIG. 4, each graphics item P0-P31 includes nine attributes (PRJ, x, y, z, w, R, G, B, and A). In this example, uGPR 27 may include nine storage locations, where the first location of uGPR 27 is associated with PRJ attribute, the second location of the uGPR 27 is associated with the x-coordinate, and so forth. Again, the data in uGPR 27 may be used by each thread of a warp.

Constants may be stored in constant buffers in system memory. Constant load instructions may be utilized to allow the compiler to load constants from system memory into constant memory 44. Constants may also be stored in GPR 26 and uGPR 27 if constant memory 44 is full.

Traditionally, no data may be saved between warps. In some examples, GPRs 26 and uGPRs 27 are reloaded or recalculated for each wave. Constant memory 44 may be saved between warps. Shader core 24, however, may access preamble instructions and execute them during the first warp. After the instructions have been executed, subsequent warps may access the result of these instructions in constant memory 44.

Figure 5:
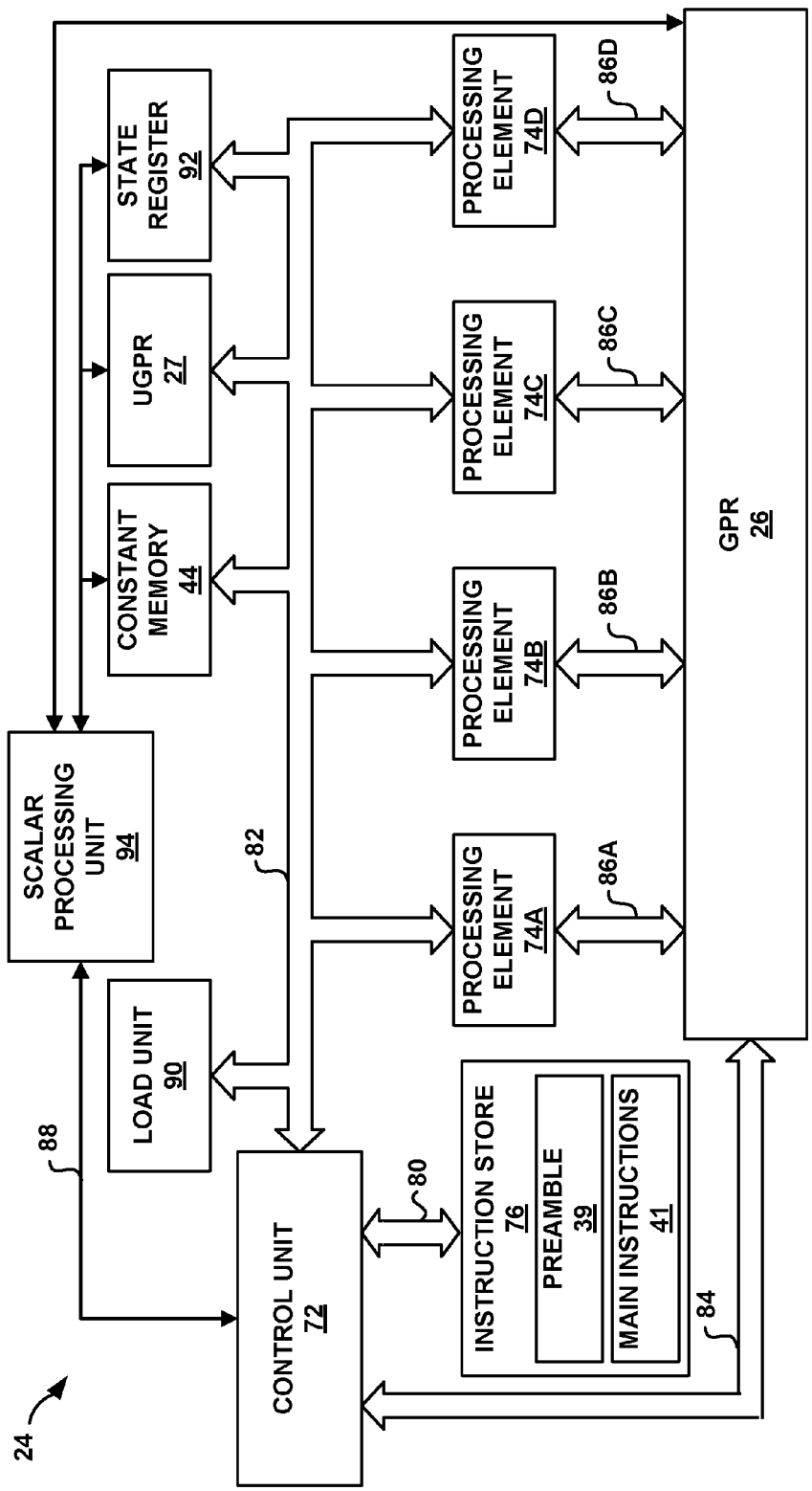
FIG. 5 is a block diagram of an example shader core of the GPU of FIG. 1 in more detail.

FIG. 5 is a block diagram illustrating an example configuration of GPU 14 that may be used to implement the techniques for uniform predicates of this disclosure. GPU 14 is configured to execute instructions for a program in a parallel manner. GPU 14 includes a shader core 24 that includes a control unit 72, processing elements 74A-74D (collectively "processing elements 74"), instruction store 76, GPR 26, constant memory 44, uGPRs 27, state registers 92, communication paths 80, 82, 84, 86A-86D, and a load unit 90. Communication paths 86A-86D may be referred to collectively as "communication paths 86." In some examples, GPU 14 may be configured as a single-instruction, multiple-data (SIMD) processing system that is configured to execute a plurality of threads of execution for a warp of a program (e.g., shader) using processing elements 74. In such a SIMD system, processing elements 74 may together process a single instruction at a time with respect to different data items. The program may retire after all of the threads associated with the program complete execution.

Control unit 72 is communicatively coupled to instruction store 76 via communication path 80, to processing elements 74 via communication path 82, and to GPR 26 via communication path 84. Control unit 72 may use communication path 80 to send read instructions to instruction store 76. A read instruction may specify an instruction address in instruction store 76 from which an instruction should be retrieved. Control unit 72 may receive one or more program instructions from instruction store 76 in response to sending the read instruction. Control unit 72 may read shader preamble 39 and main shader instructions 41 from instruction store 76. Control unit 72 may determine whether the preamble has been previously executed (via a flag stored in on-chip state register 92, uGPR 27, or GPR 26). Control unit may determine whether the current warp is the first warp (via a flag stored in on-chip state register 92, uGPR 27, or GPR 26). Control unit 72 may also change the foregoing flags when the underlying state changes (e.g., the preamble has been executed and/or the current warp is not the first warp). Use of the foregoing flags by control unit 72 may ensure that the preamble code is only executed a single time and that no subsequent (e.g. second, third, etc.) warps may begin before the preamble has completed execution. Control unit 72 may use communication path 82 to provide instructions to processing elements 74, and in some examples, to receive data from processing elements 74, e.g., the result of a comparison instruction for evaluating a branch condition. In some examples, control unit 72 may use communication path 84 to retrieve data items values from state register 92, uGPR 27, GPR 26, or constant memory 44, e.g., to determine a branch condition. Although FIG. 5 illustrates GPU 14 as including a communication path 84, in other examples, GPU 14 may not include a communication path 84.

Constant values may originally be stored in constant buffers in system memory 16. Load unit 90 may load, via instructions from control unit 72, compiler 38, and/or graphics driver 40, the constant values from the constant buffers in system memory 16 to constant memory 44, uGPR 27, or GPR 26. Load unit 90 may be configured to load constants in uGPR 27 if space allocated in constant memory 44 is full.

Each of processing elements 74 may be configured to process instructions for the program stored in instruction store 76. In some examples, each of processing elements 74 may be configured to perform the same set of operations. For example, each of processing elements 74 may implement the same instruction set architecture (ISA). In additional examples, each of processing elements 74 may be an arithmetic logic unit (ALU). In further examples, GPU 14 may be configured as a vector processor, and each of processing elements 74 may be a processing element within the vector processor. In additional examples, GPU 14 may be a SIMD execution unit, and each of processing elements 74 may be a SIMD processing element within the SIMD execution unit.

The operations performed by processing elements 74 may include arithmetic operations, logic operations, comparison operations, etc. Arithmetic operations may include operations such as, e.g., an addition operation, a subtraction operation, a multiplication operation, etc. The arithmetic operations may also include, e.g., integer arithmetic operations and/or floating-point arithmetic operations. The logic operations may include operations, such as, e.g., a bit-wise AND operation, a bit-wise OR operation, a bit-wise XOR operation, etc. The comparison operations may include operations, such as, e.g., a greater than operation, a less than operation, an equal to zero operation, a not equal to zero operation, etc. The greater than and less than operations may determine whether a first data item is greater than or less than a second data item. The equal to zero and not equal to zero operations may determine whether a data item is equal to zero or not equal to zero. The operands used for the operations may be stored in registers contained in GPR 26 or uGPR 27.

Each of processing elements 74 may be configured to perform an operation in response to receiving an instruction from control unit 72 via communication path 82. In some examples, each of processing elements 74 may be configured to be activated and/or deactivated independently of the other processing elements 74. In such examples, each of processing elements 74 may be configured to perform an operation in response to receiving an instruction from control unit 72 when the respective processing element 74A-74D is activated, and to not perform the operation in response to receiving the instruction from control unit 72 when the respective processing element 74A-74D is deactivated, i.e., not activated.

Each of processing elements 74A-74D may be communicatively coupled to GPR 26 via a respective communication path 86A-86D. Processing elements 74 may be configured to retrieve data from GPR 26, uGPR 27, and/or constant memory 44 and store data to GPR 26 via communication paths 86, uGPR 27, and/or constant memory 44. The data retrieved from GPR 26, uGPR 27, and/or constant memory 44 may, in some examples, be operands for the operations performed by processing elements 74. The data stored in GPR 26, uGPR 27, and/or constant memory 44 may, in some examples, be the result of an operation performed by processing elements 74.

Instruction store 76 is configured to store a program for execution by GPU 14. The program may be stored as a sequence of instructions. These instructions may include shader preamble 39 and main shader instructions 41. In some examples, each instruction may be addressed by a unique instruction address value. In such examples, instruction address values for later instructions in the sequence of instructions are greater than instruction address values for earlier instructions in the sequence of instructions. The program instructions, in some examples, may be machine-level instructions. That is, in such examples, the instructions may be in a format that corresponds to the ISA of GPU 14. Instruction store 76 is configured to receive a read instruction from control unit 72 via communication path 80. The read instruction may specify an instruction address from which an instruction should be retrieved. In response to receiving the read instruction, instruction store 76 may provide an instruction corresponding to the instruction address specified in the read instruction to control unit 72 via communication path 80.

Instruction store 76 may be any type of memory, cache or combination thereof. When instruction store 76 is a cache, instruction store 76 may cache a program that is stored in a program memory external to GPU 14. Although instruction store 76 is illustrated as being within GPU 14, in other examples, instruction store 76 may be external to GPU 14.

GPR 26 is configured to store data items used by processing elements 74. In some examples, GPR 26 may comprise a plurality of registers, each register being configured to store a respective data item within a plurality of data items operated on GPU 14. GPR 26 may be coupled to one or more communication paths (not shown) that are configured to transfer data between the registers in GPR 26 and a memory or cache (not shown).

uGPR 27 is configured to store data items used by processing elements 74 and each memory element within uGPR 27 is configured to be accessible by multiple processing elements (e.g. threads/fibers) of a wave/warp.

State register 92, uGPR 27, or GPR 26 may store a number of flags used by control unit 72. Flags stored in State register 92, uGPR 27, or GPR 26 may include a flag to denote that the preamble has been previously executed. This flag may allow control unit 72 to time the processing of the threads in the warp to begin after the shader preamble 39 has completely executed and the results of the execution are stored in constant memory 44, uGPR 27, and/or GPR 26. The flag denoting that the preamble has been previously executed may initially be set to "off" in State register 92, uGPR 27, or GPR 26. State register 92, uGPR 27, or GPR 26 may also include a flag to denote that the current warp is the first warp. The flag denoting that the current warp is the first warp may initially be set to "on."

Although FIG. 5 illustrates a single GPR 26 for storing data used by processing elements 74, in other examples, GPU 14 may include separate, dedicated data stores for each of processing elements 74. GPU 14 illustrates four processing elements 74 for exemplary purposes. In other examples, GPU 14 may have many more processing elements in the same or a different configuration.

Control unit 72 is configured to control GPU 14 to execute instructions for a program stored in instruction store 76. For each instruction or set of instructions of the program, control unit 72 may retrieve the instruction from instruction store 76 via communication path 80, and process the instruction. In some examples, control unit 72 may process the instruction by causing an operation associated with the instruction to execute on one or more of processing elements 74. For example, the instruction retrieved by control unit 72 may be an arithmetic instruction that instructs GPU 14 to perform an arithmetic operation with respect to data items specified by the instruction, and control unit 72 may cause one or more of processing elements 74 to perform the arithmetic operation on the specified data items. In further examples, control unit 72 may process the instruction without causing an operation to be performed on processing elements 74.

Control unit 72 may cause an operation to be performed on one or more of processing elements 74 by providing an instruction to processing elements 74 via communication path 82. The instruction may specify the operation to be performed by processing elements 74. The instruction provided to the one or more of processing elements 74 may be the same as or different than the instruction retrieved from instruction store 76. In some examples, control unit 72 may cause the operation to be performed on a particular subset of processing elements 74 (including by a single processing element) by one or both of activating a particular subset of processing elements 74 upon which the operation should be performed and deactivating another subset of processing elements 74 upon which the operation should not be performed. Control unit 72 may activate and/or deactivate processing elements 74 by providing respective activation and/or deactivation signals to each of processing elements 74 via communication path 82. In some examples, control unit 72 may activate and/or deactivate processing elements 74 by providing activation and/or deactivation signals to processing elements 74 in conjunction with providing an instruction to processing elements 74. In further examples, control unit 72 may activate and/or deactivate processing elements 74 prior to providing an instruction to processing elements 74. Control unit 72 may execute a plurality of threads of execution for a program using processing elements 74. A plurality of threads to be executed in parallel is sometimes called a warp. Each of processing elements 74 may be configured to process instructions of the program for a respective thread of the plurality of threads. For example, control unit 72 may assign each thread of execution to an individual one of processing elements 74 for processing. The threads of execution for the program may execute the same set of instructions with respect to different data items in a set of data items. For example, processing element 74A may execute a first thread of execution for a program stored in instruction store 76 with respect to a first subset of data items in a plurality of data items, and processing element 74B may execute a second thread of execution for the program stored in instruction store 76 with respect to a second subset of data items in the plurality of data items. The first thread of execution may include the same instructions as the second thread of execution, but the first subset of data items may be different than the second subset of data items. Processing elements 74 may execute main shader instructions 41. Processing elements 74 may execute shader preamble 39. In another example, shader core 24 may utilize a separate scalar processing unit 94, via communications path 88, to execute the instructions of shader preamble 39.

Scalar processing unit 94 may be any type of processor that is configured to operate on one data item at a time. Like processing elements 74, scalar processing unit 94 may include an ALU. The operations performed by scalar processing unit 94 may include arithmetic operations, logic operations, comparison operations, etc. Arithmetic operations may include operations such as, e.g., an addition operation, a subtraction operation, a multiplication operation, a division operation, etc. The arithmetic operations may also include, e.g., integer arithmetic operations and/or floating-point arithmetic operations. The logic operations may include operations, such as, e.g., a bit-wise AND operation, a bit-wise OR operation, a bit-wise XOR operation, etc. The comparison operations may include operations, such as, e.g., a greater than operation, a less than operation, an equal to zero operation, a not equal to zero operation, etc. The greater than and less than operations may determine whether a first data item is greater than or less than a second data item. The equal to zero and not equal to zero operations may determine whether a data item is equal to zero or not equal to zero. The operands used for the operations may be stored in registers contained in GPR 26.

When a shader instruction referencing a result of a preamble instruction is executed, the (constant) result is retrieved from GPR 26 instead of executing the shader preamble instructions again.

Figure 6:
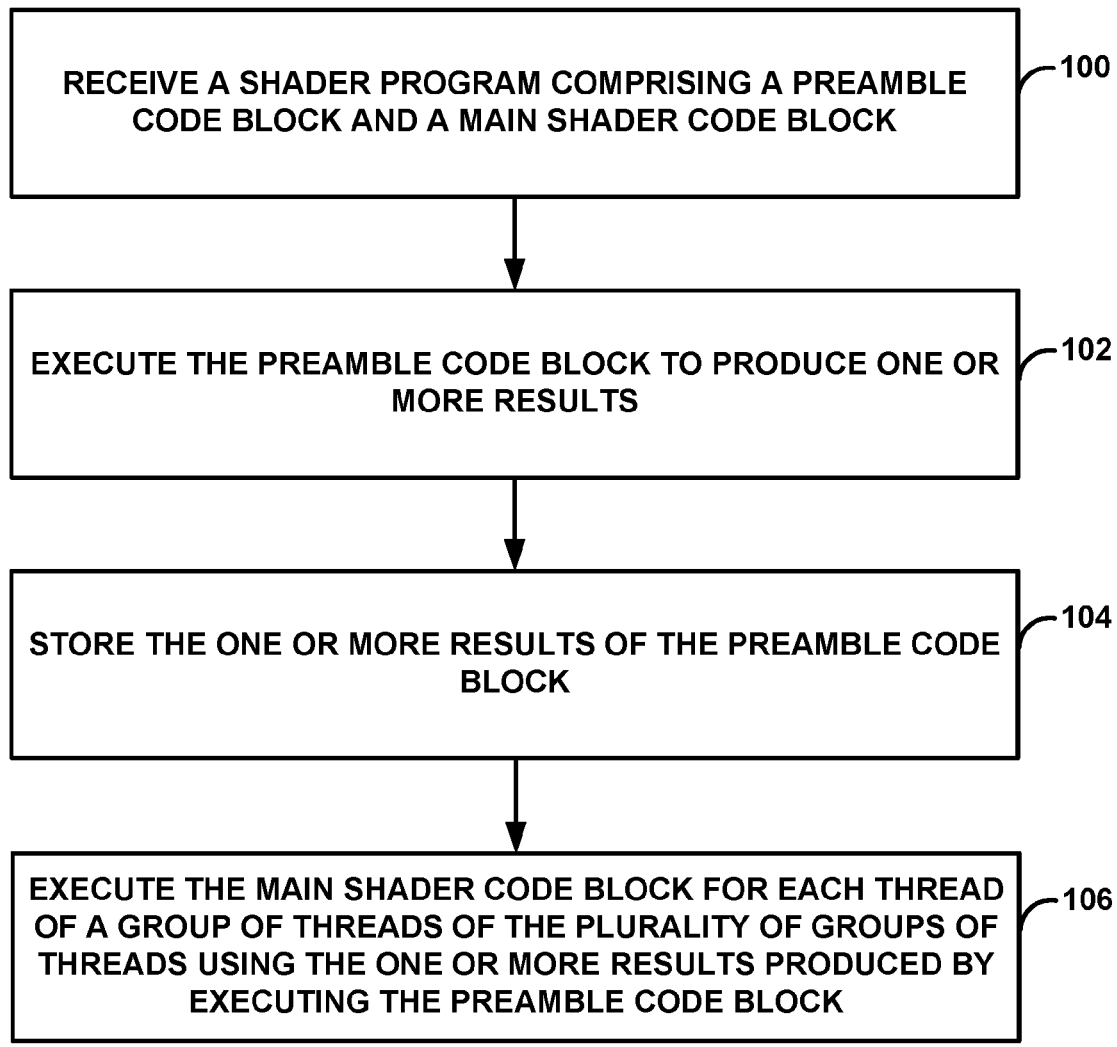
FIG. 6 is a flowchart illustrating an example technique of processing data in a GPU.

FIG. 6 is a flowchart illustrating an example method according to the techniques of this disclosure. The techniques of FIG. 6 may be implemented by one or more of GPU 14 and/or processor 12 (see FIGS. 1 and 2).

In one example of the disclosure, GPU 14 may be configured to receive from a shader compiler 38 a shader program comprising a preamble code block and a main shader code block (100). The preamble code block being executable to produce one or more results, the one or more results may be the same one or more results for each of a plurality of groups of threads (e.g., a wave/warp) executing the shader program. GPU 14 may be further configured to execute the preamble code block to produce one or more results (102). The preamble code block may be executed by scalar processing unit 94 on GPU 14. The preamble code block may evaluate to a constant value.

GPU 14 may be further configured to store the one or more results of the preamble code block (104). The results may be stored in on-chip random access memory (RAM). The on-chip RAM may be accessible by each of the plurality of groups of threads and may be accessible by all processing elements of a shader core 24. The on-chip RAM may be accessible by GPU 14 without accessing a main bus. The on-chip RAM may include a writeable buffer managed cache. Upon a determination that the GPU 14 has completed storing the result of the code block of instructions common to the plurality of groups of threads of the shader, GPU 14 may be configured to execute the main shader code block for each thread of a group of threads of the plurality of groups of threads using the one or more results produced by executing the preamble code block (106). In one example of the disclosure, GPU 14 may be configured to identify the preamble code block based on identifying a shader preamble start instruction.

In a further example of the disclosure, GPU 14 may be configured to track whether or not that the preamble code block has been executed by the first group of threads allowing the shader to execute a subsequent group of threads of the plurality of groups of threads. GPU 14 may also be configured to track whether or not any group of threads of the plurality of groups of threads has executed prior to the first group of threads to determine, at least in part, whether or not the preamble code block has been executed previously. GPU 14 may also be configured to track whether or not the preamble code block has been executed to determine, at least in part, whether to execute the preamble code block. In an additional example of the disclosure, GPU 14 may be configured to load the one or more results of the preamble code block from constant buffers located in system RAM (e.g., not on-chip RAM) into on-chip constant memory.

A shader compiler (e.g. compiler 38) running on processor 12 may identify a code block of instructions being executable to produce the one or more results being the same one or more results for each of a plurality of groups of threads executing the shader program. The shader compiler (e.g. compiler 38) running on processor 12 may also group the code block of instructions into the preamble code block of the shader program. Such grouping may be used by GPU 14. Identification of the code block of instructions common to the plurality of groups of threads of the shader instructions may include identification of instructions that evaluate to a constant. The identifiable code block may be organized into a preamble code. The preamble code may be configured to be executed by a first group of threads of a plurality of groups of threads. The one or more result of the executed preamble code may be useable by other groups of the plurality of groups of threads.

Figure 7:
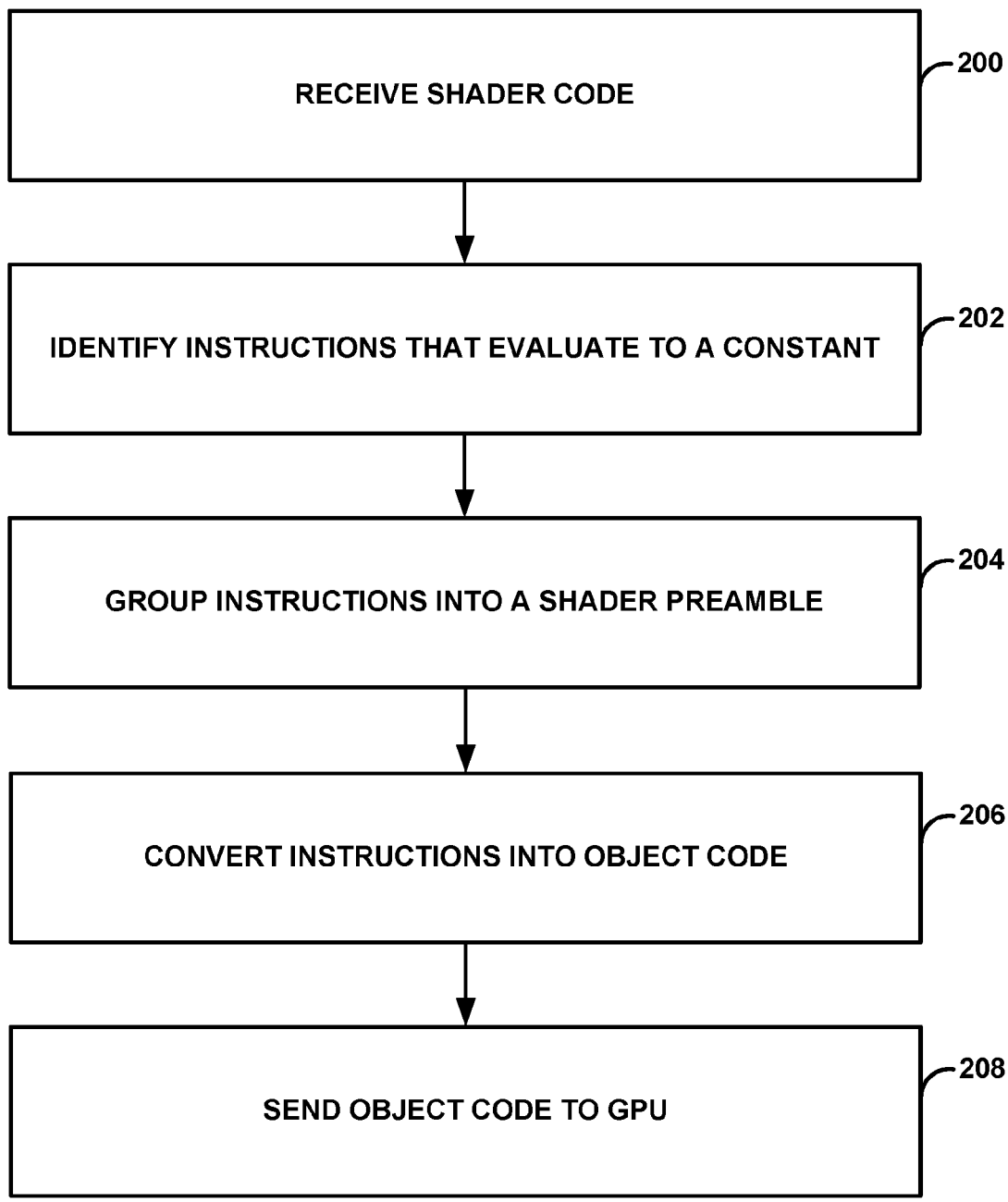
FIG. 7 is a flowchart illustrating an example technique of compiling a shader program.

FIG. 7 is a flowchart illustrating an example method according to the techniques of this disclosure. The techniques of FIG. 7 may be implemented by one or more of GPU 14 and/or processor 12 (see FIGS. 1 and 2).

Compiler 38 executing on processor 12 may receive shader code (200). Compiler 38 executing on processor 12 may identify instructions that evaluate to a constant (202). Compiler 38 executing on processor 12 may group the instructions into a shader preamble (204). The shader preamble may be delineated by a shader preamble start and a shader preamble end command. Compiler 38 executing on processor 12 may convert instructions in the shader code into object code (206). Such object code is configured to run on GPU 14. Compiler 38 executing on processor 12 may send the object code to GPU 14 for execution on a shader core 24.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of operating a graphic processing unit (GPU) comprising:
receiving, by the GPU from a shader compiler, a shader program comprising a preamble code block and a main shader code block, the preamble code block being executable to produce one or more results, the one or more results being a same one or more results for each of a plurality of groups of threads executing the shader program;
executing, by the GPU on a first group of threads of the plurality of groups of threads, the preamble code block to produce the one or more results;
storing, by the GPU, the one or more results of the preamble code block, the one or more results of the preamble code block accessible by each of the plurality of groups of threads; and
upon a determination that storing all of the one or more results of the preamble code block has completed, executing, by the GPU, the main shader code block for each thread of a group of threads of the plurality of groups of threads using the one or more results produced by executing the preamble code block.

2. The method of claim 1, further comprising:
identifying, by the shader compiler running on a processor, a code block of instructions being executable to produce the one or more results being the same one or more results for each of a plurality of groups of threads executing the shader program; and
grouping, by the shader compiler running on the processor, the code block of instructions into the preamble code block of the shader program.

3. The method of claim 2, wherein the identification of the code block of instructions comprises identification of instructions that evaluate to a constant.

4. The method of claim 1, further comprising:
identifying the preamble code block based on identifying a shader preamble start instruction.

5. The method of claim 1, further comprising:
tracking whether or not that the preamble code block has been executed by the first group of threads allowing the GPU to execute a subsequent group of threads of the plurality of groups of threads.

6. The method of claim 1, further comprising:
tracking whether or not any group of threads of the plurality of groups of threads has executed prior to the first group of threads to determine, at least in part, whether or not the preamble code block has been previously executed.

7. The method of claim 1, further comprising:
tracking whether or not the preamble code block has been executed to determine, at least in part, whether to execute the preamble code block.

8. The method of claim 1, wherein the execution of the preamble code block is executed by a scalar processor on the GPU.

9. The method of claim 1, wherein the storage of the one or more results is on a writeable buffer managed cache.

10. The method of claim 1, wherein the storage of the one or more results is accessible by all processing elements of a shader processor.

11. The method of claim 1, wherein the preamble code block evaluates to one or more constant results.

12. The method of claim 1, further comprising:
loading, by the GPU, the one or more results of the preamble code block from random access memory (RAM) into a constant memory.

13. An apparatus for processing data, the apparatus comprising:
a graphics processing unit (GPU), the GPU comprising a memory and a shader core, the shader core comprising a control unit, a plurality of processing elements, and a constant memory, wherein the control unit is configured to:
  receive, from a shader compiler, a shader program comprising a preamble code block and a main shader code block, the preamble code block being executable to produce one or more results, the one or more results being a same one or more results for each of a plurality of groups of threads executing the shader program;
  direct at least one of the plurality of processing elements to execute, on a first group of threads of the plurality of groups of threads, the preamble code block to produce the one or more results;
  store the one or more results of the preamble code block in the constant memory, the one or more results of the preamble code block accessible by each of the plurality of groups of threads; and
  upon a determination that storing all of the one or more results of the preamble code block has completed, direct at least one of the plurality of processing elements to execute the main shader code block for each thread of a group of threads of the plurality of groups of threads using the one or more results produced by executing the preamble code block.

14. The apparatus of claim 13, further comprising a processor, wherein the processor is configured to:
  identify a code block of instructions being executable to produce the one or more results being the same one or more results for each of a plurality of groups of threads executing the shader program; and
  group the code block of instructions into the preamble code block of the shader program.

15. The apparatus of claim 14, wherein the identification of the code block of instructions comprises identification of instructions that evaluate to a constant.

16. The apparatus of claim 13, wherein the control unit is further configured to:
  identify the preamble code block based on identifying a shader preamble start instruction.

17. The apparatus of claim 13, wherein the control unit is further configured to:
  track whether or not that the preamble code block has been executed by the first group of threads allowing the GPU to execute a subsequent group of threads of the plurality of groups of threads.

18. The apparatus of claim 13, wherein the control unit is further configured to:
  track whether or not any group of threads of the plurality of groups of threads has executed prior to the first group of threads to determine, at least in part, whether or not the preamble code block has been previously executed.

19. The apparatus of claim 13, wherein the control unit is further configured to:
  track whether or not the preamble code block has been executed to determine, at least in part, whether to execute the preamble code block.

20. The apparatus of claim 13, wherein the execution of the preamble code block is executed by a scalar processor of the plurality of processing elements.

21. The apparatus of claim 13, wherein the stored one or more results is accessible by all processing elements of the shader core.

22. An apparatus configured to operate a graphic processing unit (GPU), the apparatus comprising:
  means for receiving, from a shader compiler, a shader program comprising a preamble code block and a main shader code block, the preamble code block being executable to produce one or more results, the one or more results being a same one or more results for each of a plurality of groups of threads executing the shader program;
  means for executing, on a first group of threads of the plurality of groups of threads, the preamble code block to produce the one or more results;
  means for storing the one or more results of the preamble code block, the one or more results of the preamble code block accessible by each of the plurality of groups of threads; and
  means for executing upon a determination that storing all of the one or more results of the preamble code block has completed, the main shader code block for each thread of a group of threads of the plurality of groups of threads using the one or more results produced by executing the preamble code block.

23. The apparatus of claim 22, further comprising:
  means for identifying a code block of instructions being executable to produce the one or more results being the same one or more results for each of a plurality of groups of threads executing the shader program; and
  means for grouping the code block of instructions into the preamble code block of the shader program.

24. The apparatus of claim 22, further comprising:
  means for identifying the preamble code block based on identifying a shader preamble start instruction.

25. The apparatus of claim 22, further comprising:
  means for tracking whether or not that the preamble code block has been executed by the first group of threads allowing the GPU to execute a subsequent group of threads of the plurality of groups of threads.

26. The apparatus of claim 22, further comprising:
  means for tracking whether or not any group of threads of the plurality of groups of threads has executed prior to the first group of threads to determine, at least in part, whether or not the preamble code block has been previously executed.

27. The apparatus of claim 22, further comprising:
  means for tracking whether or not the preamble code block has been executed to determine, at least in part, whether to execute the preamble code block.

28. The apparatus of claim 22, wherein the preamble code block evaluates to one or more constant results.

29. The apparatus of claim 22, further comprising:
  means for loading the one or more results of the preamble code block from random access memory (RAM) into a constant memory.

30. A non-transitory computer-readable storage medium including instructions stored thereon that, when executed, cause at least one processor of to:
  receive, from a shader compiler, a shader program comprising a preamble code block and a main shader code block, the preamble code block being executable to produce one or more results, the one or more results being a same one or more results for each of a plurality of groups of threads executing the shader program;
  execute, on a first group of threads of the plurality of groups of threads, the preamble code block to produce the one or more results;
  store the one or more results of the preamble code block in a constant memory, the one or more results of the preamble code block accessible by each of the plurality of groups of threads; and
  upon a determination that storing all of the one or more results of the preamble code block has completed, execute the main shader code block for each thread of a group of threads of the plurality of groups of threads using the one or more results produced by executing the preamble code block.

\* \* \* \* \*